US011523006B2

(12) United States Patent
Wakabayashi

(10) Patent No.: US 11,523,006 B2
(45) Date of Patent: Dec. 6, 2022

(54) INFORMATION PROCESSING METHOD, INFORMATION PROCESSING APPARATUS, AND STORAGE MEDIUM

(71) Applicant: CANON KABUSHIKI KAISHA, Tokyo (JP)

(72) Inventor: Yuuki Wakabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/898,260

(22) Filed: Jun. 10, 2020

(65) Prior Publication Data

US 2020/0396344 A1    Dec. 17, 2020

(30) Foreign Application Priority Data

Jun. 13, 2019    (JP) .............................. JP2019-110638

(51) Int. Cl.
     *H04N 1/00*          (2006.01)

(52) U.S. Cl.
CPC ..... *H04N 1/00214* (2013.01); *H04N 1/00244* (2013.01); *H04N 1/00307* (2013.01); *H04N 1/00424* (2013.01)

(58) Field of Classification Search
CPC ........... H04N 1/00214; H04N 1/00244; H04N 1/00424; H04N 1/00307
USPC ...................................................... 358/1.15
See application file for complete search history.

(56) References Cited

U.S. PATENT DOCUMENTS

| | | | | |
|---|---|---|---|---|
| 6,311,175 B1* | 10/2001 | Adriaans | ............. | G06F 11/3495 706/25 |
| 2004/0233472 A1* | 11/2004 | Gassho | ................. | G06F 3/1207 358/1.15 |
| 2005/0281577 A1* | 12/2005 | Tamura | .............. | G03G 15/5016 399/81 |
| 2006/0044593 A1* | 3/2006 | Kawakami | ............ | G06F 3/1259 358/1.14 |
| 2007/0132802 A1* | 6/2007 | Ouchi | .................... | B41J 29/393 347/19 |
| 2007/0153340 A1* | 7/2007 | Itagaki | ................... | G03G 15/01 358/504 |
| 2009/0316205 A1* | 12/2009 | Nakada | .............. | H04N 1/00355 358/1.15 |
| 2011/0299106 A1* | 12/2011 | Mori | ...................... | G06F 3/1288 358/1.9 |
| 2012/0197991 A1* | 8/2012 | Ramani | .................. | G06Q 10/10 709/204 |
| 2012/0307272 A1* | 12/2012 | Suzuki | ................. | G06F 3/1203 358/1.9 |
| 2014/0320319 A1* | 10/2014 | Redmann | .............. | B60L 53/665 340/932.2 |
| 2015/0095889 A1* | 4/2015 | Kawahara | ........... | G06F 11/3668 717/124 |

(Continued)

FOREIGN PATENT DOCUMENTS

| | | | | |
|---|---|---|---|---|
| CN | 1810022 | * | 7/2006 | ........... H04N 1/3875 |
| JP | 2014048720 A | | 3/2014 | |

Primary Examiner — Jerome Grant, II
(74) Attorney, Agent, or Firm — Canon U.S.A., Inc. IP Division

(57) ABSTRACT

Predetermined information for determining whether an input screen on which a user inputs an evaluation of a program is to be displayed is received from a server. If the received predetermined information indicates that the input screen is to be displayed, the input screen is displayed on a display included in an information processing apparatus.

25 Claims, 13 Drawing Sheets

(56) References Cited

U.S. PATENT DOCUMENTS

| | | | |
|---|---|---|---|
| 2016/0112493 A1* | 4/2016 | Yasuhara | H04L 63/10 |
| | | | 709/219 |
| 2016/0274825 A1* | 9/2016 | Minegishi | G06F 3/1257 |
| 2016/0306597 A1* | 10/2016 | Sakuraba | G06F 3/1285 |
| 2016/0366293 A1* | 12/2016 | Ono | H04N 1/00474 |
| 2017/0364939 A1* | 12/2017 | Abou Mahmoud | |
| | | | G06Q 30/0231 |
| 2018/0300093 A1* | 10/2018 | Ishida | G06F 3/1285 |
| 2018/0330066 A1* | 11/2018 | Hase | G06F 21/305 |
| 2020/0089440 A1* | 3/2020 | Takeo | G06F 3/1255 |
| 2020/0356314 A1* | 11/2020 | Saito | G06F 3/1224 |

* cited by examiner

FIG.8

800 — Print Advanced Settings

801 —
Number-of-Copies Setting
Individually Set

Date Printing
Off

Automatic Photograph Correction
On

Red-Eye Correction
Off

Sheet Size
L-Size

Type of Sheet
Photograph Sheet: Gloss

Sheet Feeding Method
Automatically Select

Print Quality
Automatic

Border Specifying
Borderless

INFORMATION PROCESSING METHOD, INFORMATION PROCESSING APPARATUS, AND STORAGE MEDIUM

BACKGROUND

Field

The present disclosure relates to an information processing method, an information processing apparatus, and a storage medium.

Description of the Related Art

A smartphone with an operating system (OS) may download an application via the Internet from a store website managed by a development vendor of the OS.

At such a store website, an evaluation of an application based on rating using the number of stars and a comment such as feedback are displayed for a user as indicators of downloading the application. The publication of Japanese Patent Application Laid-Open No. 2014-48720 discusses a technique for evaluating an application.

For such an evaluation of an application, the application may display a screen on which a user evaluates the application. An evaluation input to the screen is reflected on a store website. Accordingly, an appropriate evaluation by a user who uses the application can be reflected on the store website.

SUMMARY

In a case where the screen on which a user evaluates an application is displayed as described above, the user evaluation may be unneeded even if obtaining the user evaluation of the application has been needed when the application has been published. Meanwhile, the user evaluation may be needed even if the user evaluation of the application has been unneeded when the application has been published. In the above described cases, if the above input screen is displayed in a case where the user evaluation of the application is unneeded, or if the input screen is not displayed in a case where the user evaluation of the application is needed, the usability decreases.

In consideration of the above-discussed points, the present disclosure features a technique capable of displaying an input screen on which a user inputs the evaluation of a program, under an appropriate condition.

According to an aspect of the present disclosure, an information processing method uses a program for causing a printing apparatus to perform printing, and at least one processor that executes the program to perform executing transmission for transmitting data corresponding to a printing target image from an information processing apparatus to the printing apparatus, receiving, from a server, predetermined information for determining whether an input screen on which a user inputs an evaluation of the program is to be displayed, and displaying, if the received predetermined information indicates that the input screen is to be displayed, the input screen on a display included in the information processing apparatus.

Further features of the present disclosure will become apparent from the following description of exemplary embodiments with reference to the attached drawings.

BRIEF DESCRIPTION OF THE DRAWINGS

FIG. 8 is a diagram illustrating a print setting screen.

DESCRIPTION OF THE EMBODIMENTS

With reference to the attached drawings, exemplary embodiments of the present disclosure will be described in detail below. The following exemplary embodiments do not limit the appended claims, and not all the combinations of the features described in the exemplary embodiments are essential for a method for solving the issues that can be addressed in accordance with the present disclosure.

The following exemplary embodiments are described taking a smartphone as an example of an information processing apparatus. The type of the information processing apparatus, however, is not limited to a smartphone so long as the apparatus can handle a file as a printing target. For example, various apparatuses other than a smartphone, such as a mobile terminal, a laptop personal computer (PC), a desktop PC, a tablet terminal, a personal digital assistant (PDA), and a digital camera, are applicable. As a printing apparatus, any printer such as an inkjet printer or a laser beam printer can be used. Alternatively, a multifunction peripheral having not only a print function but also a scan function for reading a document, a copy function, and a facsimile function may be used.

<Overall Configuration of System>

Figure 1:
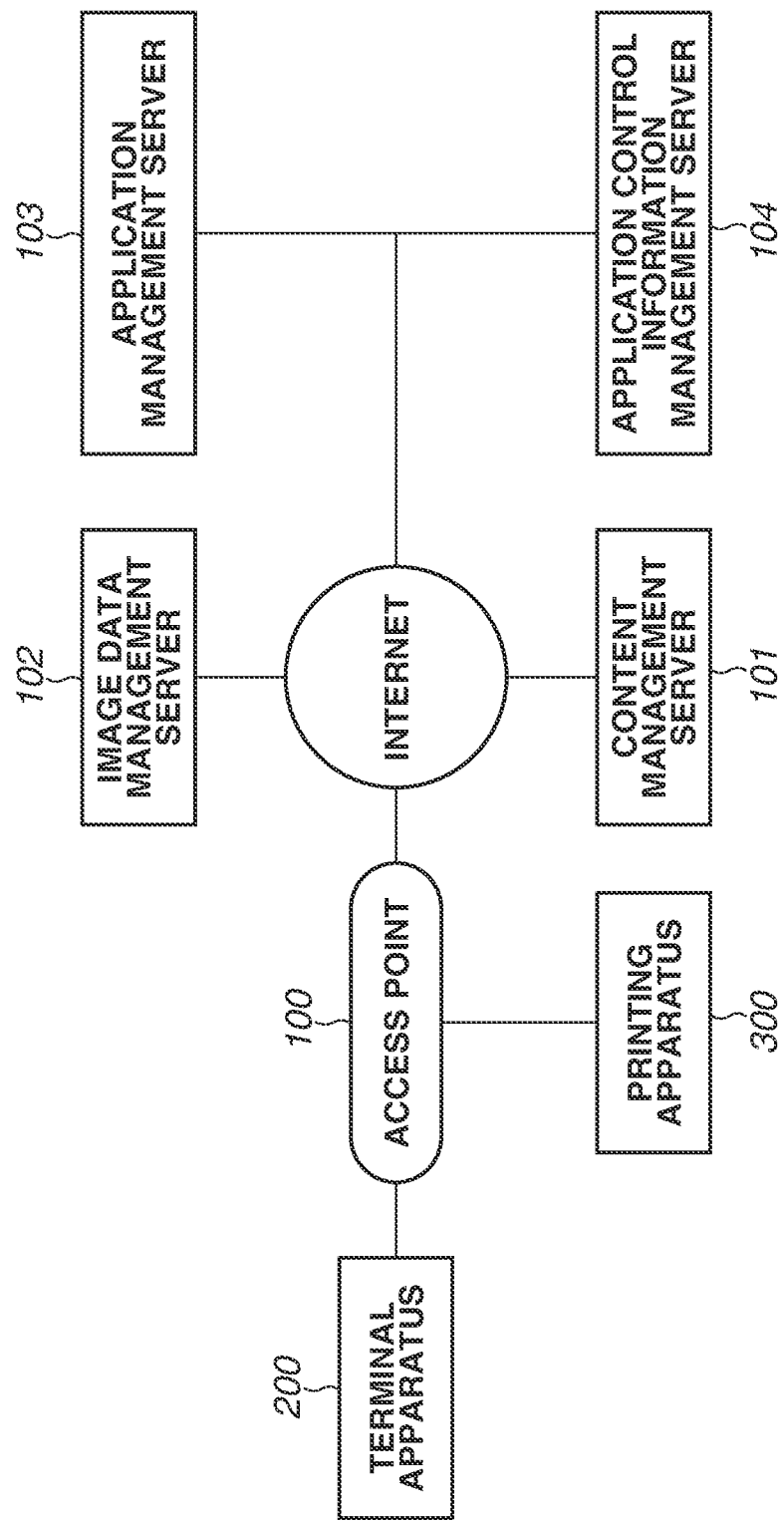
FIG. 1 is a block diagram illustrating a configuration of a print processing system.

FIG. 1 is a block diagram illustrating the configuration of a print processing system according to a first exemplary embodiment. This print processing system includes a terminal apparatus 200 of a mobile type, such as a smartphone, and a printing apparatus 300. The terminal apparatus 200 is an information processing apparatus that communicates with the printing apparatus 300 via a network established by an access point 100 and causes the printing apparatus 300 to execute printing. The terminal apparatus 200 stores a program, such as a print application (hereinafter also referred to as a "print app"). Thus, print data created using the print application is transmitted from the terminal apparatus 200 to the printing apparatus 300 via the network. Since the access point 100 according to the present exemplary embodiment functions as a wireless local area network (LAN) router, the terminal apparatus 200 is connected to the Internet via the wireless LAN router. Thus, the terminal apparatus 200 can communicate with a content management server 101 via the Internet. While FIG. 1 illustrates only a single printing apparatus 300, a plurality of printing apparatuses 300 can connect to the access point 100.

The content management server 101 is an information processing apparatus that manages a template that is used by the print application. An image data management server 102 is a server that can save image data captured using a camera by a user. An application management server 103 is a server that manages a smartphone application and also manages evaluations of individual applications. An application control information management server 104 holds application control information according to the present exemplary embodiment. The application control information includes information indicating whether a rating information input dialog is to be displayed which is to be describe below.

<Configuration of Terminal Apparatus>

Figure 2:
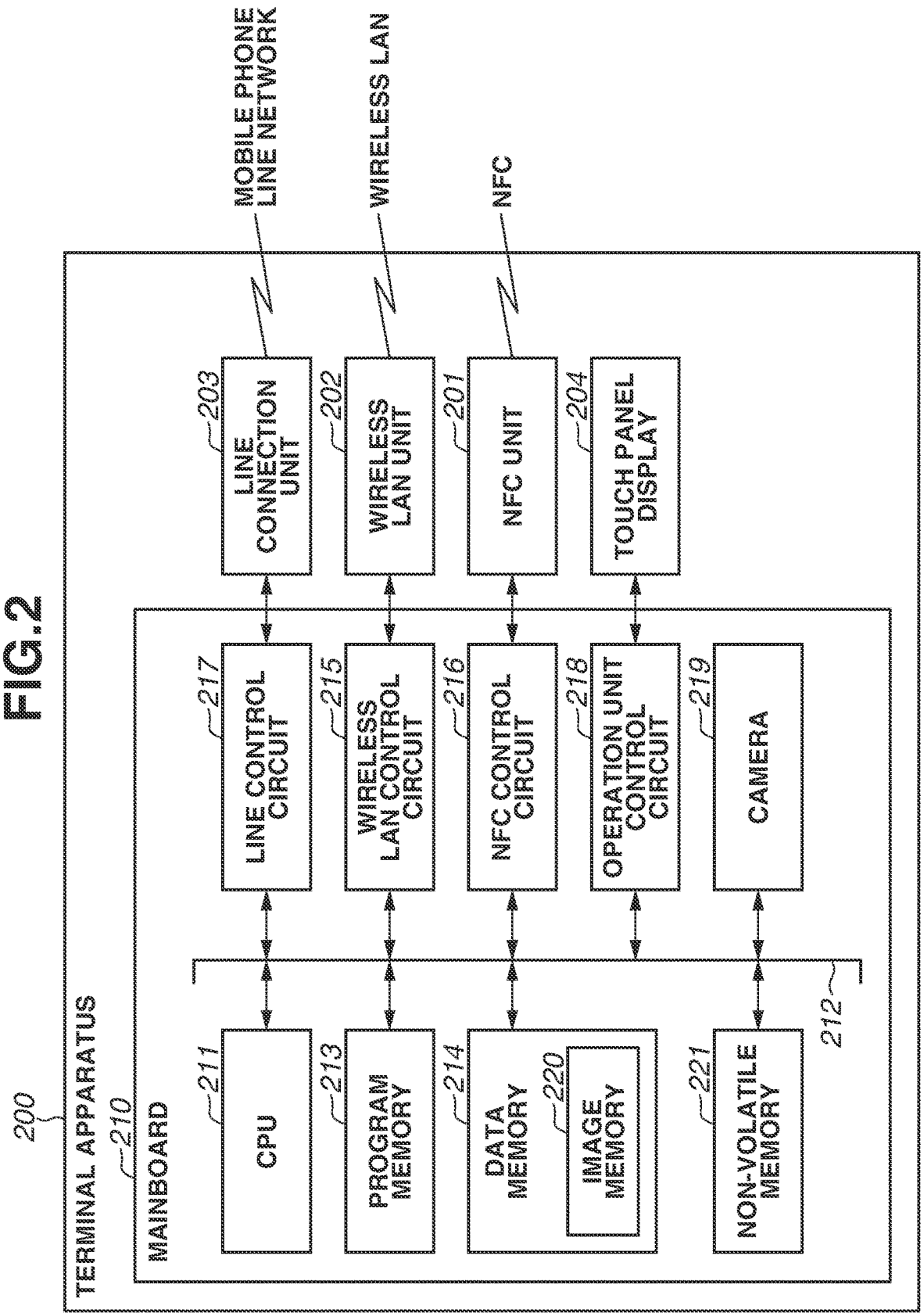
FIG. 2 is a block diagram illustrating a configuration of a terminal apparatus.

FIG. 2 is a block diagram illustrating the configuration of the terminal apparatus 200 that is used in the print processing system. The terminal apparatus 200 includes a mainboard 210 that controls the entire apparatus, a wireless LAN unit 202, a near-field communication (NFC) unit 201, a line connection unit 203, and a touch panel display 204 that displays a function operation of a printer and information regarding a printer. The NFC unit 201, the wireless LAN unit 202, and the line connection unit 203 can perform communication using NFC communication, a wireless LAN, and a mobile phone line network, respectively.

A central processing unit (CPU) 211 in the form of a microprocessor mounted on the mainboard 210 operates according to a control program stored in a program memory 213 in the form of a read-only memory (ROM) and the content of a data memory 214 in the form of a random-access memory (RAM) which are connected to the CPU 211 via the internal bus 212. The program memory 213 can store an embedded operating system (OS) and a program, such as the print application program, according to the present exemplary embodiment. In the present exemplary embodiment, application programs stored in the program memory 213 are subjected to software execution control under control of the OS. Specifically, the software execution control is achieved by the CPU 211 loading each application program stored in the program memory 213 into the data memory 214 in the form of a RAM and executing the application program.

The CPU 211 controls the wireless LAN unit 202 via a wireless LAN control circuit 215 to communicate with another communication terminal apparatus, using the wireless LAN. The wireless LAN unit 202 can communicate data (a packet) using a communication method compliant with, for example, the Institute of Electrical and Electronics Engineers (IEEE) 802.11 series (IEEE 802.11a, IEEE 802.11b, or IEEE 802.11g).

The CPU 211 controls the NFC unit 201 via an NFC control circuit 216 to detect a connection with another NFC terminal using NFC and to transmit and receive data to and from another NFC terminal. The CPU 211 further controls the line connection unit 203 via a line control circuit 217 to connect to the mobile phone line network and to perform a telephone call or transmit and receive data. The CPU 211 may also include a unit for performing a communication method compliant with Bluetooth® Low Energy (Bluetooth® LE).

The CPU 211 controls an operation unit control circuit 218 to perform display on the touch panel display 204 and to receive an operation from the user. The CPU 211 controls a camera unit 219 to capture an image, and stores the captured image in an image memory 220 in the data memory 214. The CPU 211 also stores an image acquired from outside via the mobile phone line network, the wireless LAN, or NFC other than the captured image in the image memory 220 and also transmits an image to outside.

A non-volatile memory 221 includes a memory such as a flash memory and stores data that the user wishes to save even after the power supply is turned off. For example, the non-volatile memory 221 stores telephone book data, various pieces of communication connection information, device information regarding devices to which the terminal apparatus 200 has connected in the past, and image data that the user wishes to save. The non-volatile memory 221 also stores application management information managed by the application according to the present exemplary embodiment, such as an application for creating nail art stickers.

<Configuration of Printing Apparatus>

Figure 3:
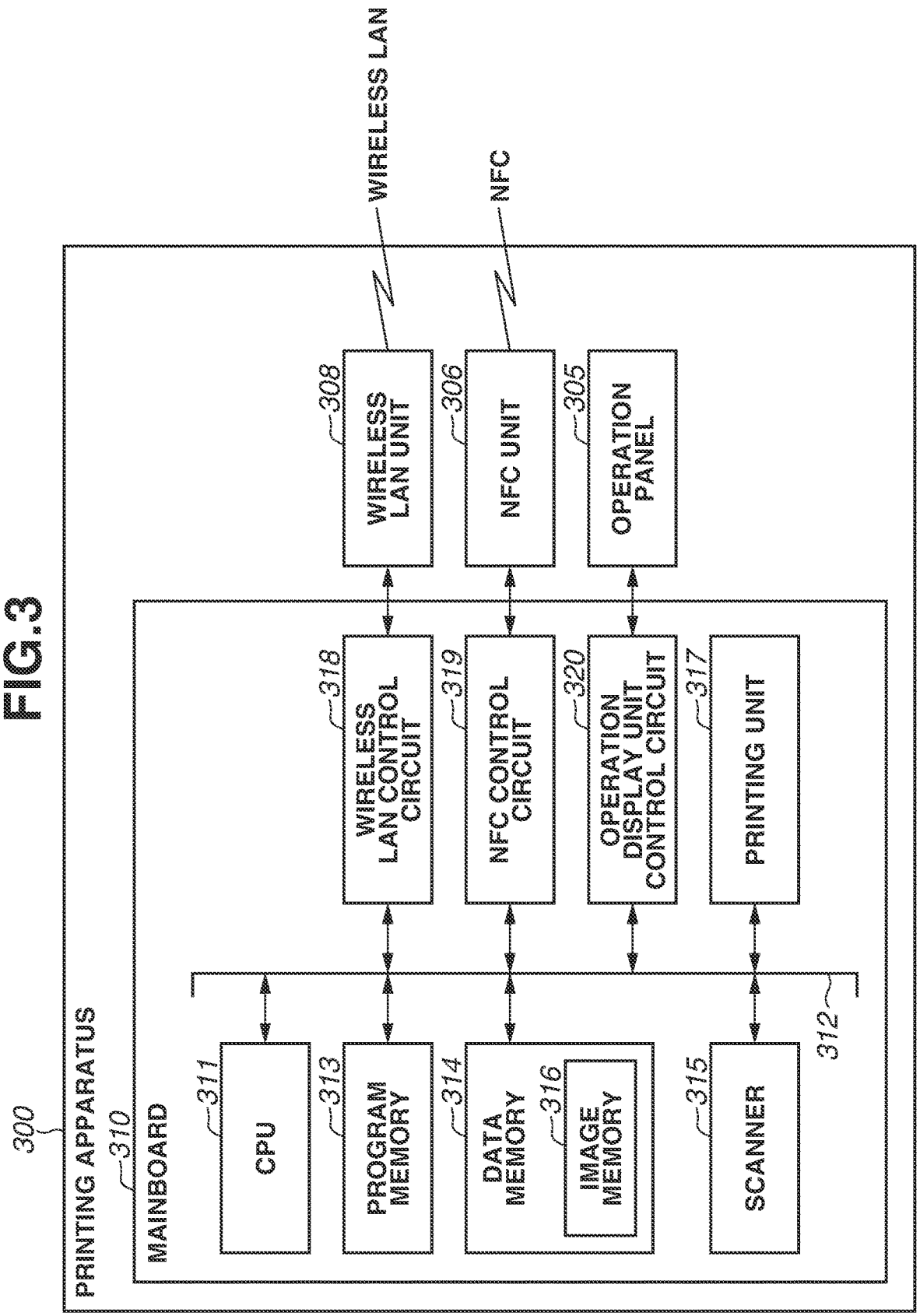
FIG. 3 is a block diagram illustrating a configuration of a printing apparatus.

FIG. 3 is a block diagram illustrating the configuration of the printing apparatus 300. The printing apparatus 300 includes a mainboard 310 that controls the entire apparatus, a wireless LAN unit 308, an NFC unit 306, and an operation panel 305. The wireless LAN unit 308 and the NFC unit 306 function as a communication unit of the printing apparatus 300.

A CPU 311 in the form of a microprocessor mounted on the mainboard 310 operates according to a control program stored in a program memory 313 in the form of a ROM and the content of a data memory 314 in the form of a RAM which are connected to the CPU 311 via the internal bus 312.

The CPU 311 controls a scanner 315 to read an image of a document and stores the image in an image memory 316 included in the data memory 314. The CPU 311 controls a printing unit 317 to print the image stored in the image memory 316 included in the data memory 314 on a recording medium. The CPU 311 also transmits scanned image data to the terminal apparatus 200 via the wireless LAN unit 308 controlled by a wireless LAN control circuit 318.

The CPU 311 controls the wireless LAN unit 308 via the wireless LAN control circuit 318 to communicate with another communication terminal apparatus, using the wireless LAN. The wireless LAN unit 308 can communicate data (a packet) using a communication method compliant with, for example, the IEEE 802.11 series (IEEE 802.11a, IEEE 802.11b, or IEEE 802.11g). The CPU 311 controls the NFC unit 306 via an NFC control circuit 319 to detect a connection with another NFC terminal using NFC and to transmit and receive data to and from another NFC terminal.

The CPU 311 controls an operation display unit control circuit 320 to display a state of the printing apparatus 300 or a function selection menu on the operation panel 305 and to receive an operation from the user.

The printing apparatus according to the present exemplary embodiment can receive and print data in the Joint Photographic Experts Group (JPEG) file format to which a printer control command is assigned.

<Configuration of Print Application>

With reference to FIGS. 4 to 10, display screens of the print application according to the present exemplary embodiment and the operations of the display screens are described. The display screens illustrated in FIGS. 4 to 10 are displayed on the touch panel display 204 by the CPU 211 executing the print application stored in the program memory 213. The description is given on the assumption that user interface control of the print application according to the present exemplary embodiment is created in a programming language that operates in a multi-platform such as HyperText Markup Language (HTML) 5 or JavaScript (registered trademark). The present disclosure, however, is not limited to this. Alternatively, the user interface control may be created in a platform-dependent language such as Java (registered trademark) or Objective-C.

Figure 4:
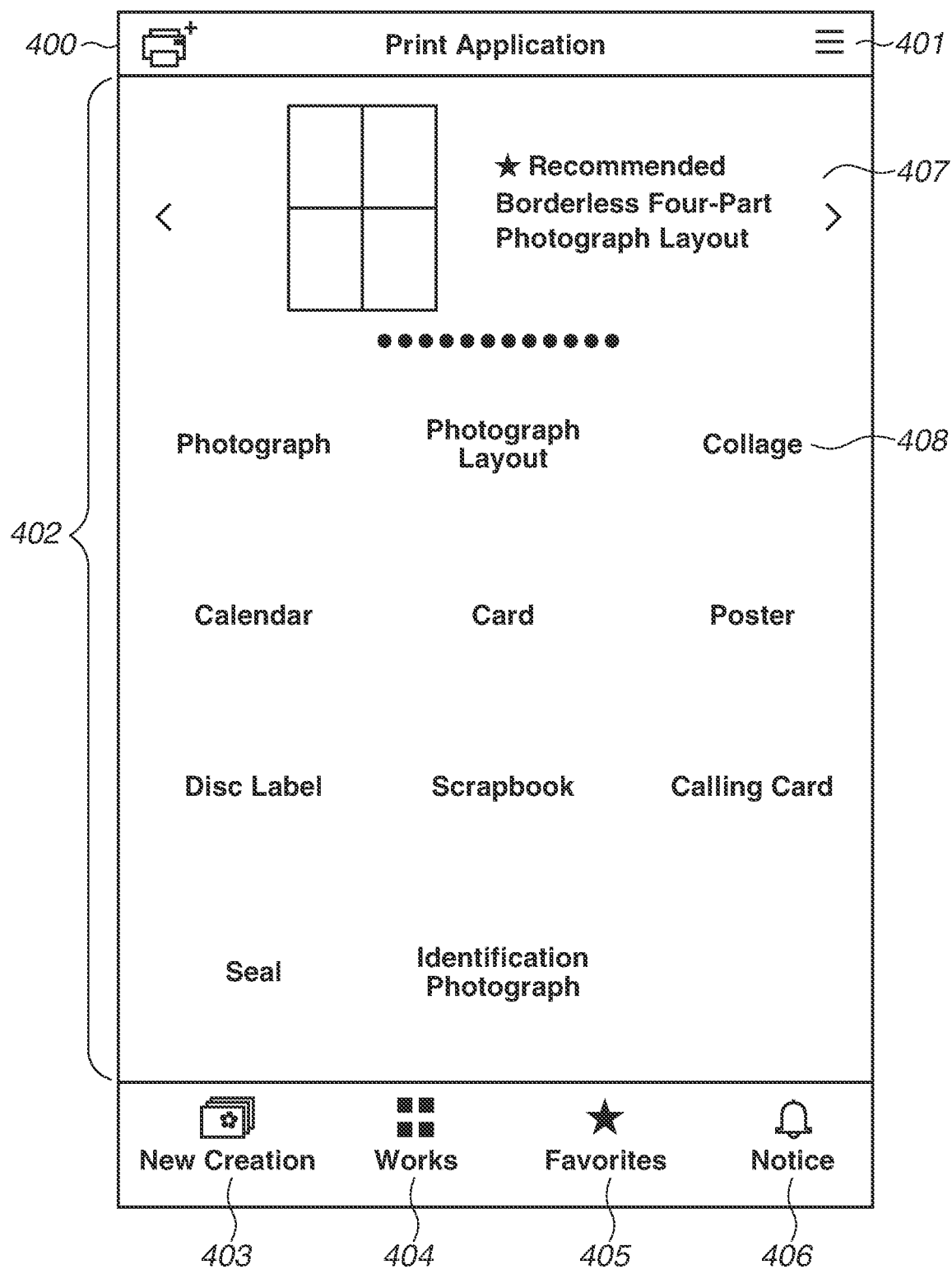
FIG. 4 is a diagram illustrating a top screen of a print application.

FIG. 4 is a diagram illustrating a top screen of the print application according to the present exemplary embodiment. On the screen illustrated in FIG. 4, a printer registration button 400, a menu button 401, a main display area 402, a new creation button 403, a work display button 404, a favorite display button 405, and a notice display button 406 are displayed.

When any of the buttons 403 to 406 is tapped, a content according to the tapped button is displayed in the main display area 402. FIG. 4 illustrates an example of display in the main display area 402 in a case where the print application is started or in a case where the new creation button 403 is tapped.

In a case where the printer registration button 400 is tapped, a printer registration screen (not illustrated) is displayed. A registration process will be described below. In a case where the menu button 401 is tapped, various pieces of information regarding the print application, such as version information and license information, are displayed.

On the main screen illustrated in FIG. 4, a plurality of category selection buttons 408 is displayed in the main display area 402. The category selection buttons 408 indicate functions for creating a work that can be printed by the print application according to the present exemplary embodiment. In FIG. 4, as the category selection buttons 408, text such as "photograph" and "photograph layout" is displayed. Alternatively, icons may be displayed with the text. In a case where any of the category selection buttons 408 is tapped, the display target of the touch panel display 204 changes to a screen for creating a work as a printing target by a function corresponding to the tapped category selection button 408. Specifically, in a case where the category selection button 408 indicated as "photograph" in FIG. 4 is tapped, "photograph", which is the function of printing image data in the JPEG or Portable Network Graphics (PNG) file format on the entire surface of a print sheet, can be used. In a case where the category selection button 408 indicated as "photograph layout" in FIG. 4 is tapped, "photograph layout printing", which is the function of laying out a plurality of pieces of image data and executing printing the plurality of pieces of image data on a print sheet, can be used. In FIG. 4, the category selection buttons 408 indicated as "collage", "calendar", "card", "poster", "disc label", "scrapbook", "business card", "seal", and "identification photograph" are included. In a case where any of these category selection buttons 408 is selected, the function of inserting an image into a template supplied with the application or a template acquired from the content management server 101 and executing printing the image can be used. A template that can be used and the number of images to be inserted into a template differ according to the category selection button 408 tapped by the user.

A pickup content display portion 407 illustrated in FIG. 4 is a display portion where a reference image that would be printed using a template recommended to the user is randomly displayed. In the example of FIG. 4, a reference image showing a layout size and a layout position of a photograph is displayed. The present disclosure, however, is not limited to this. Alternatively, a reference image in which a sample photograph is laid out may be displayed. For example, as a case illustrated in the example of FIG. 4, a reference image in which four sample photographs are placed in four divided layout areas may be displayed.

In a case where the work display button 404 illustrated in FIG. 4 is tapped, a list of works saved by the user is displayed in icons in the main display area 402. The works displayed in the list in this process are pieces of image data of printing targets which are created by the user after selection of any of the category selection buttons 408, and thumbnails of the pieces of image data are displayed in the list. In the display of the list, the works may be classified according to functions corresponding to the category selection buttons 408 and the thumbnails of the classified works may be displayed.

In a case where the favorite display button 405 is tapped, a list of templates registered as favorites by the user is displayed in the main display area 402. In a case where the notice display button 406 is tapped, notice information regarding the application, such as a notification of an update of a template, is displayed in the main display area 402.

A description is given of an example of display in a case where any of the category selection buttons 408 is tapped. In a case where any of the category selection buttons 408 is tapped, the top screen changes to an image data selection screen. However, in a case of a function using a template, the image data selection screen is displayed after the category selection button 408 is tapped and if an instruction to insert an image into the template is performed by the user. In the present exemplary embodiment, a case where the category selection button 408 indicated as "photograph" in FIG. 4 is tapped will be described.

Figure 5:
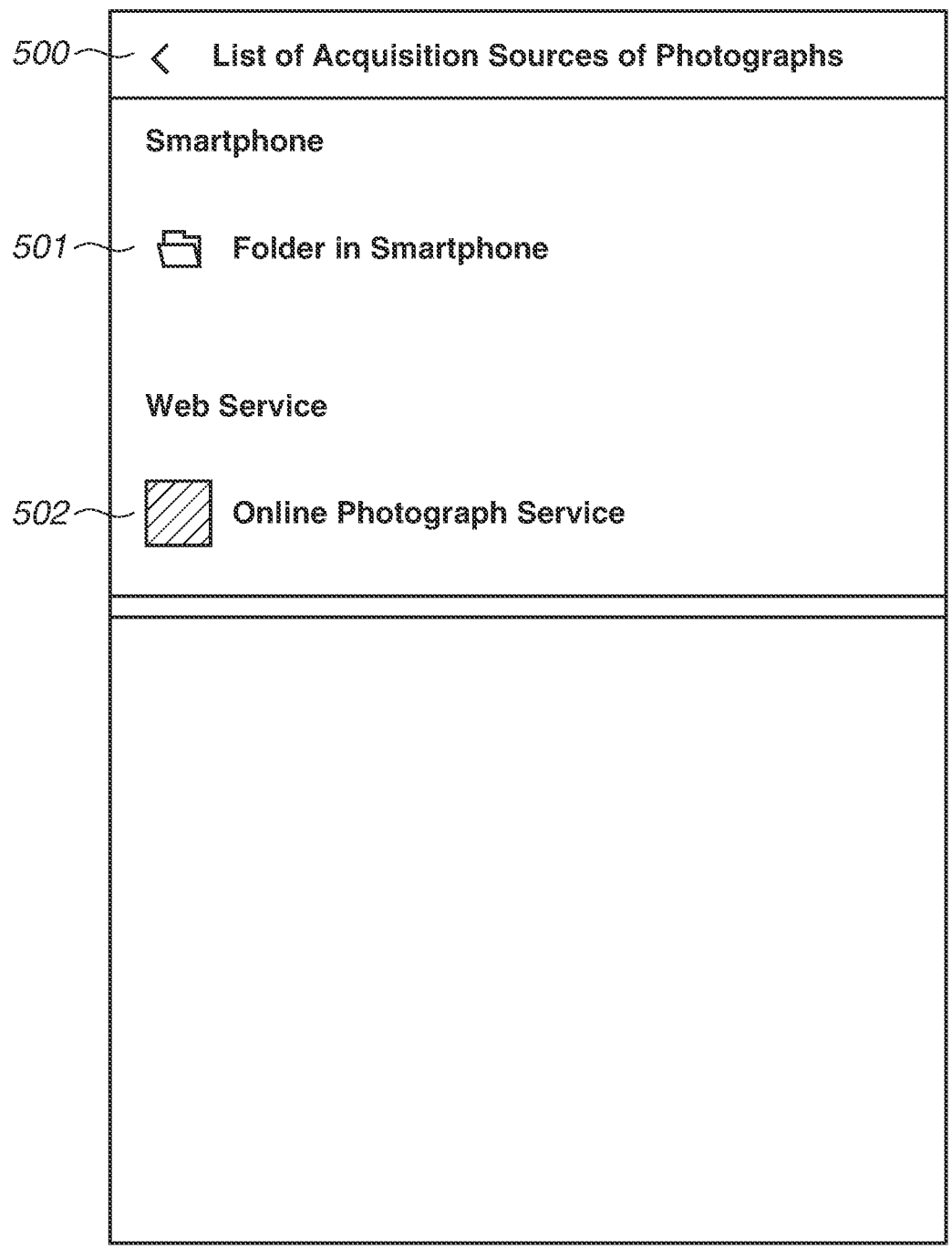
FIG. 5 is a diagram illustrating an image data selection screen.

FIG. 5 is a diagram illustrating the image data selection screen. The image data selection screen includes a return button 500, a local image selection button 501, and a cloud image selection button 502. In a case where the return button 500 is tapped, the touch panel display 204 changes the display target to the screen displayed before the currently displayed screen. In a case where the local image selection button 501 is tapped, a list of pieces of image data stored in the data memory 214 of the terminal apparatus 200 is displayed, and the user can select desired image data as a printing target from the list. The display area of the local image selection button 501 includes both an icon of a folder and a text string "folder in smartphone". In a case where the cloud image selection button 502 is tapped, pieces of image data of the user are acquired from the image data management server 102, and a list of the acquired pieces of image data is displayed. Then, the user can select a desired image as a printing target from the list of images. The display area of the cloud image selection button 502 includes both an icon and a text string "online photograph service". Alternatively, a plurality of the cloud image selection buttons 502 each corresponding to different one of online photograph services (online photograph storage) may be displayed. In this case, icons corresponding to the respective online photograph services are displayed. In a case where the cloud image selection button 502 is tapped, a login screen for logging into the online photograph service may be displayed. When the user inputs a user account and a password on the login screen and in a case where the authentication of the image data management server 102 is successful based on these pieces of information, a list of images managed in association with the user account is displayed.

Figure 6:
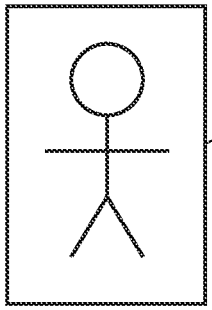
FIG. 6 is a diagram illustrating a print setting checking screen.

FIG. 6 is a diagram illustrating a print setting checking screen, which is displayed after the user selects a printing target image on the screen illustrated in FIG. 5. The print setting checking screen includes a return button 600, a printing start button 601, a preview display portion 602, a number-of-copies setting button 603, a work editing button 604, registered printer information 605, a print setting button 606, and a print setting display portion 607. In a case where the return button 600 is tapped, the display target screen changes to the screen displayed before the screen illustrated in FIG. 6. In a case where the printing start button 601 is tapped, a print job is transmitted to the printing apparatus 300 based on set print settings, and a printing-in-progress screen (described below) is displayed. In a case where the work editing button 604 is tapped, a work editing screen (described below) is displayed. In the preview display portion 602, a print preview based on the printing target image selected by the user on the screen illustrated in FIG. 5 is displayed. As the print preview, a thumbnail of the printing target image selected by the user may be displayed without being cropped, or an image cropped based on the sheet size and the setting of the presence or absence of a border that are currently set as print settings may be displayed. In the case of displaying a cropped image, an accurate image of a printing result can be displayed.

In a case where the number-of-copies setting button 603 is tapped, the user can set the number of copies to be printed. In a lower portion of the screen illustrated in FIG. 6, "total number of copies to be printed: 1" is displayed. Display indicating the currently set number of copies is thus performed. On the screen illustrated in FIG. 5, the user can select a plurality of printing target images. Then, the number of copies set using the number-of-copies setting button 603 is reflected on the plurality of printing target images. In the lower portion of the screen illustrated in FIG. 6, the total number of copies of the plurality of printing target images is displayed. On a print setting screen described below, the same number of copies can be collectively set for the plurality of printing target images, or the number of copies can be individually set for each of the plurality of printing target images.

The registered printer information 605 indicates the name of an already registered printer and the Internet Protocol (IP) address of the printer on the LAN. In a case where a plurality of printers is registered, and if the user taps the registered printer information 605, a list of pieces of registered printer information 605 regarding the plurality of printers is displayed. Then, in a case where the user taps any of the pieces of registered printer information 605 corresponding to a desired printer in the list, a printer corresponding to the tapped registered printer information 605 is selected as a printer for use in printing. Then, the list is hidden, and the screen illustrated in FIG. 6 is displayed again. In this process, the information tapped in the list is displayed as the registered printer information 605.

In a case where the print setting button 606 is tapped, a print setting screen for changing print settings is displayed. The details of the print setting screen will be described below. In the print setting display portion 607, the currently set print settings are displayed. When print settings are changed on the print setting screen, and the screen illustrated in FIG. 6 is displayed again, the changed print settings are displayed in the print setting display portion 607. The print settings displayed in the print setting display portion 607 are stored in the program memory 213 or the non-volatile memory 221, and when the print application ends and is started again, the print settings are displayed again in the print setting display portion 607. In a case where the print setting checking screen illustrated in FIG. 6 is displayed for the first time after the print application is installed on the terminal apparatus 200, default print settings determined in the print application are displayed in the print setting display portion 607.

FIG. 8 is a diagram illustrating the print setting screen, which is displayed in a case where the print setting button 606 illustrated in FIG. 6 is tapped. The print setting screen illustrated in FIG. 8 includes a return button 800 and a print setting button 801. The print setting button 801 includes items such as "number-of-copies setting", "date printing", "automatic photograph correction", "red-eye correction", "sheet size", "type of sheet", "sheet feeding method", "print quality", and "border setting". In a case where the print setting button 801 is tapped, options for print settings are displayed in a list. The user determines a desired option, to set a print setting. In a case where the item "number-of-copies setting" is tapped, the user can select whether to collectively set the same number of copies for a plurality of printing target images or individually set the number of copies for each of the plurality of printing target images. After the selection, the user may collectively set or individually set the number of copies for the plurality of printing target images.

Figure 7:
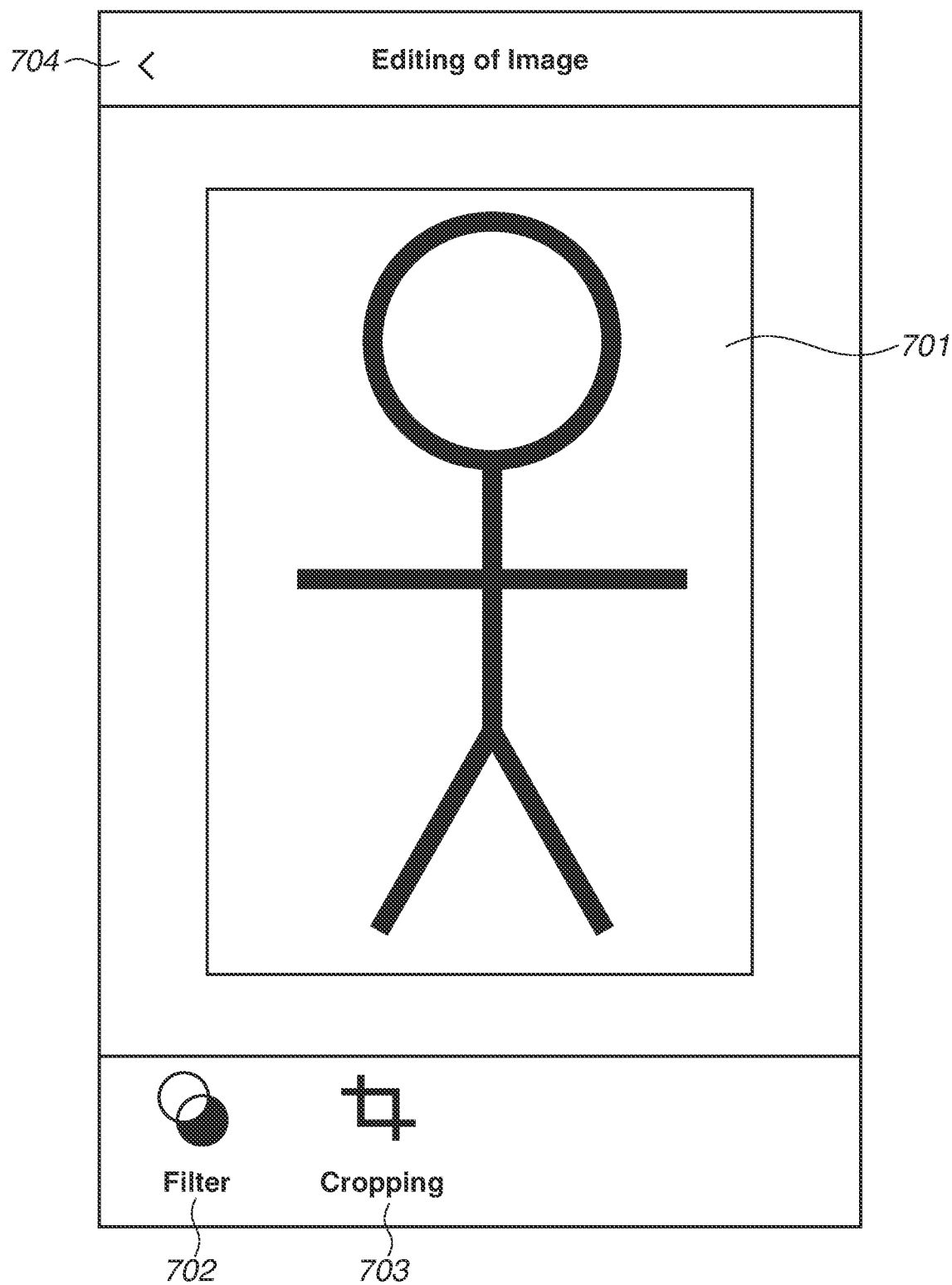
FIG. 7 is a diagram illustrating a work editing screen.

FIG. 7 is a diagram illustrating the work editing screen, which is displayed in a case where the work editing button 604 is tapped. The work editing screen illustrated in FIG. 7 displays a return button 704, an editing result display portion 701, a filter instruction button 702, and a cropping instruction button 703. In a case where the return button 704 is tapped, the touch panel display 204 displays the screen displayed before the screen illustrated in FIG. 7 again. In a case where the filter instruction button 702 is tapped, a filter application screen (not illustrated) is displayed. The user can apply a filter process using a monochrome or sepia filter to a print work (the printing target image) on the filter application screen. In a case where the cropping instruction button 703 is tapped, a cropping instruction screen is displayed. On the cropping instruction screen, the user can perform cropping settings (a setting regarding whether to crop the image, and the settings of the size and the position of a cropping area) for a print work (the printing target image). In the editing result display portion 701, the edited print work (the edited printing target image) is displayed. For example, in a case where the filter process is applied and/or cropping settings are performed as described above, the printing target image subjected to the filter process and/or the cropping is displayed in the editing result display portion 701. Then, in a case where the return button 704 is tapped, the image subjected to the filter process and/or the cropping as described above is set as a printing target to be actually printed, and the screen illustrated in FIG. 6 is displayed again. In a case where the printing start button 601 illustrated in FIG. 6 is tapped in this state, the image subjected to the filter process and/or the cropping by the print application is transmitted to the printing apparatus 300 and printed.

Figure 9:
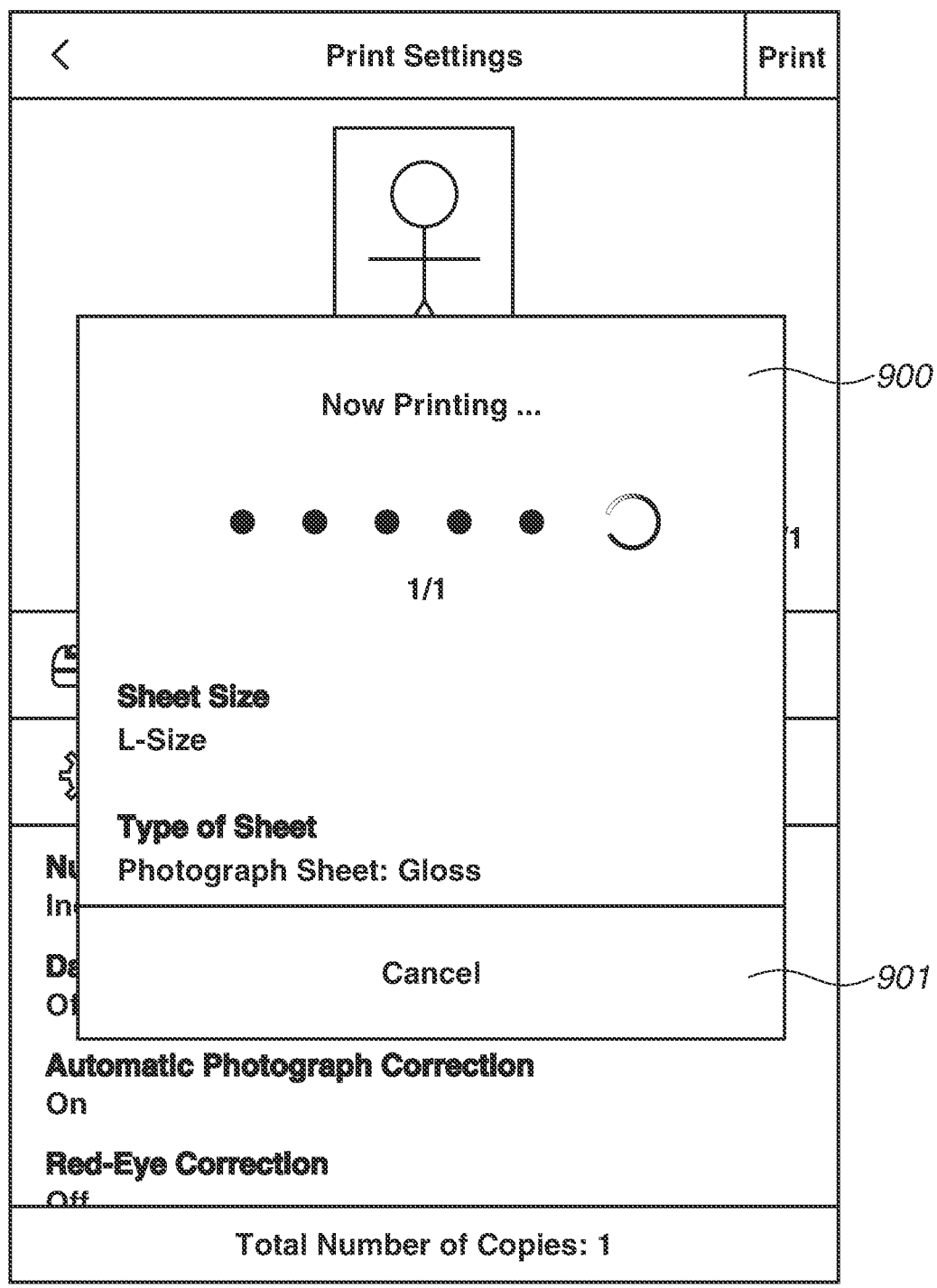
FIG. 9 is a diagram illustrating a printing-in-progress screen.

FIG. 9 is a diagram illustrating the printing-in-progress screen. In a case where the printing start button 601 included in the print setting checking screen is tapped, a printing state display dialog 900 is displayed at the center of the screen. The printing state display dialog 900 displays a message indicating the printing state, such as "now printing", the total number of images to be printed, the number of printed images, print settings (the sheet size and the type of sheet), and a cancellation button 901. In a case where the cancellation button 901 is tapped, the printing is cancelled. When the printing is completed, the printing state display dialog 900 is hidden, and the print setting checking screen as illustrated in FIG. 6 is displayed again.

Figure 10:
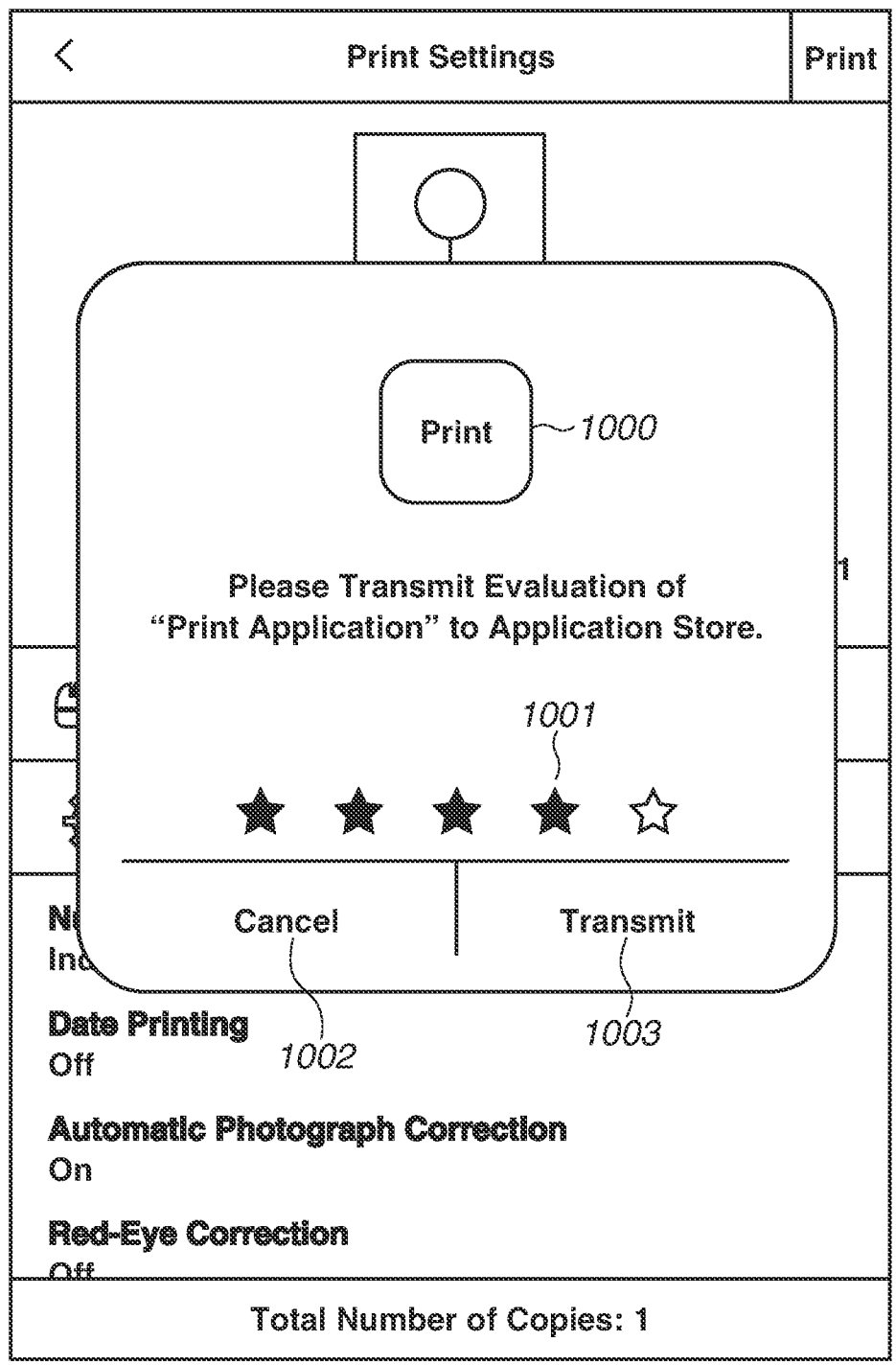
FIG. 10 is a diagram illustrating a rating information input screen.

FIG. 10 is a diagram illustrating a rating information input screen. As will be described below, when the printing is completed, the printing-in-progress screen in FIG. 9 is hidden and the screen illustrated in FIG. 10 is displayed. The rating information input screen illustrated in FIG. 10 includes a rating information input dialog 1000, a rating information input portion 1001, a cancellation button 1002, and a transmission button 1003. The user can input an application evaluation based on the number of stars to the rating information input portion 1001. Specifically, the user can input the number of stars from one to five, and the greater the number of stars is, the higher evaluation is indicated. In a case where the transmission button 1003 is tapped, the application evaluation input to the rating information input portion 1001 is transmitted to the application management server 103 by the processing of the OS. Then, the transmitted application evaluation is reflected on the evaluations of the print application managed by the application management server 103. In a case where the cancellation button 1002 is tapped, the application evaluation input to the rating information input portion 1001 is discarded. Then, the rating information input dialog 1000 is hidden, and the print setting checking screen as illustrated in FIG. 6 is displayed again. The rating information input screen illustrated in FIG. 10 is displayed by instructing the OS to display the rating information input screen, via an application programming interface (API) provided by the OS by the processing of the print application. Then, rating information is transmitted by the processing of the OS. The present disclosure, however, is not limited to such a configuration. Alternatively, the rating information input screen may be displayed by various methods, or the rating information may be transmitted by various methods.

<Processing Procedure>

Figure 11:
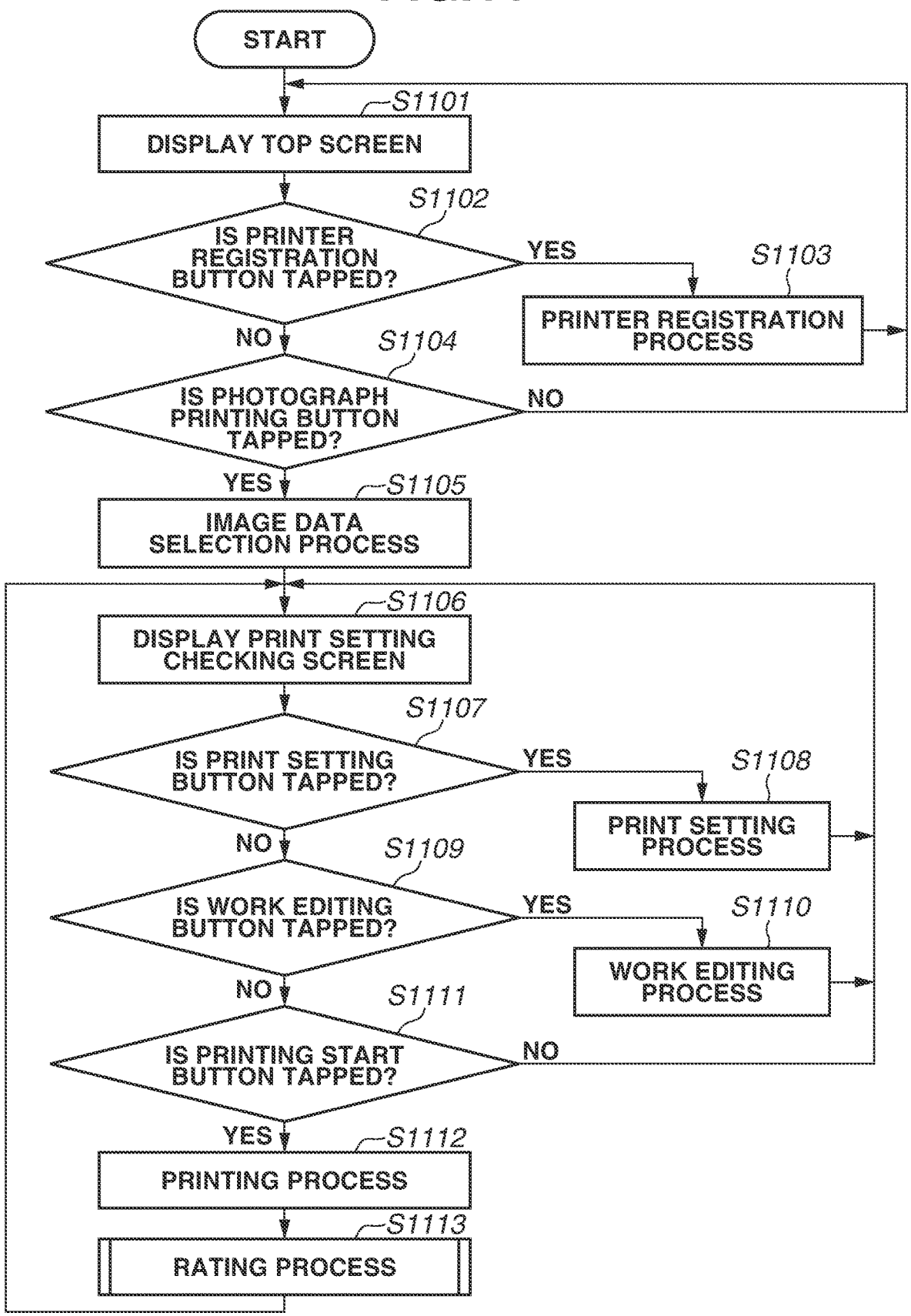
FIG. 11 is a flowchart illustrating a printing process and a rating process according to the present exemplary embodiment.
Figure 12:
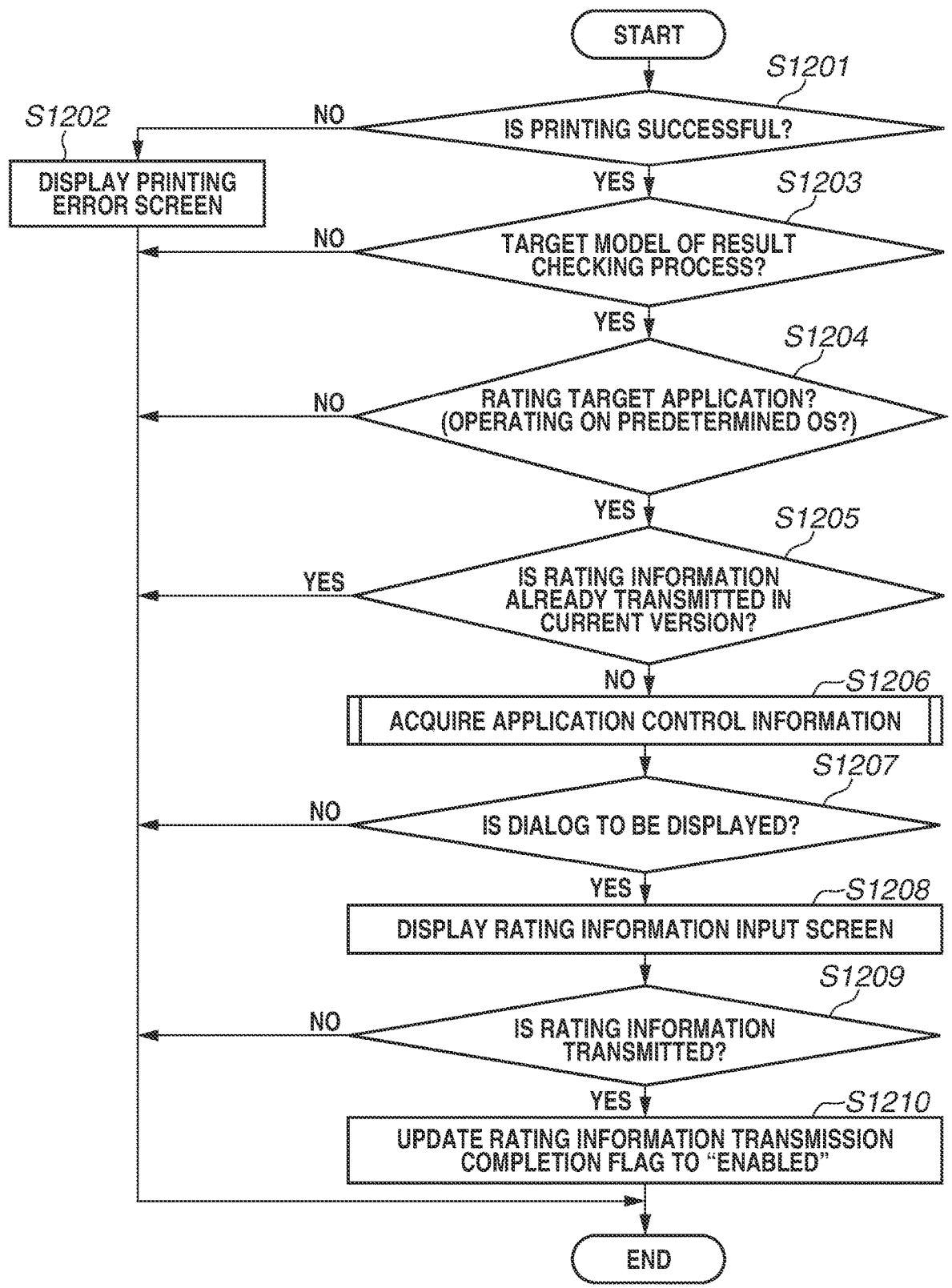
FIG. 12 is a flowchart illustrating details of the rating process according to the exemplary embodiment.

A processing procedure according to the present exemplary embodiment is described. Flowcharts illustrated in FIGS. 11 and 12 are achieved by the CPU 211 loading the print application program stored in the program memory 213 or the non-volatile memory 221 into the data memory 214 as a RAM and executing the print application program. Not all the processing illustrated in FIGS. 11 and 12 may be sequentially executed in a single process. For example, there can also be a case where the processing temporarily transfers to the OS so that the OS performs the processing, the OS calls the print application again, and the print application executes the subsequent processing.

FIG. 11 is a diagram illustrating a printing process and a rating process according to the present exemplary embodiment. In FIG. 11, a description is given using as an example a case where the user taps the category selection button 408 indicated as "photograph" on the top screen illustrated in FIG. 4, and printing is performed. The processing of the flowchart illustrated in FIG. 11 is started when the CPU 211 starts the print application. Then, although not illustrated in FIG. 11, when the print application ends, the processing illustrated in FIG. 11 also ends.

In a case where the print application is started, then in step S1101, the CPU 211 displays the top screen of the print application illustrated in FIG. 4. In step S1102, the CPU 211 determines whether the printer registration button 400 is tapped on the top screen. In a case where it is determined that the printer registration button 400 is tapped (YES in step S1102), the processing proceeds to step S1103. In step S1103, the CPU 211 displays the printer registration screen (not illustrated).

In step S1103, the CPU 211 searches for printing apparatuses connected to the network to which the terminal apparatus 200 belongs. Then, the CPU 211 displays a list of found printing apparatuses on the touch panel display 204.

Then, when a single printer (e.g., the printing apparatus 300) is selected from the plurality of printing apparatuses in the displayed list by a user input, the CPU 211 starts a registration process. Specifically, the CPU 211 communicates with the printing apparatus 300, acquires capability information regarding the print settings of the printing apparatus 300, and holds the capability information in the data memory 214. The capability information includes the model name of the apparatus, attribute information, and print settings that can be set. After the registration process in step S1103 as described above, then in step S1101, the CPU 211 displays the top screen again on the touch panel display 204.

In step S1102, in a case where the CPU 211 determines that the printer registration button 400 is not tapped (NO in step S1102), the processing proceeds to step S1104. In step S1104, the CPU 211 determines whether any of the category selection buttons 408, that is the "photograph" button in this case, is tapped on the top screen. In a case where the CPU 211 determines that the "photograph" button is tapped as any of the category selection buttons 408 (YES in step S1104), the processing proceeds to step S1105. In step S105, the CPU 211 displays the image data selection screen illustrated in FIG. 6. Based on a user operation on the image data selection screen, the CPU 211 selects image data as a printing target. The display of the image data selection screen and the selection of the image data in step S1105 may be executed as the processing of the print application, or may be executed as the processing of another application. For example, in a case where the print application issues an image selection instruction to the OS via the API, the OS may start a predetermined application for managing a photograph, and the predetermined application may display an image data selection screen. Then, when the user selects image data on the image data selection screen, the OS may transfer the selected image data or the file path to the selected image data to the print application.

In step S1106, the CPU 211 displays the print setting checking screen illustrated in FIG. 6. In step S1107, the CPU 211 determines whether the print setting button 606 is tapped on the print setting checking screen. In a case where the CPU 211 determines that the print setting button 606 is tapped (YES in step S1107), the processing proceeds to step S1108. In step S1108, the CPU 211 displays the print setting screen illustrated in FIG. 8. Based on a user operation on the print setting screen, the CPU 211 sets print settings desired by the user. In a case where the CPU 211 determines that the print setting button 606 is not tapped (NO in step S107), the processing proceeds to step S1109. In step S1109, the CPU 211 determines whether the work editing button 604 is tapped. In a case where the CPU 211 determines that the work editing button 604 is tapped (YES in step S1109), the processing proceeds to step S1110. In step S1110, the CPU 211 displays the work editing screen illustrated in FIG. 7. Based on a user operation on the work editing screen, the CPU 211 performs a work editing process, such as a filter process or a cropping process, desired by the user on the image data selected in step S1105. The image data selected in step S1105 is stored in a predetermined storage area in the image memory 220 assigned to the print application, by the OS. Then, the filter process or the cropping process as described above is executed on the image data stored in the predetermined storage area.

In a case where the CPU 211 determines that the work editing button 604 is not tapped (NO in step S1109), the processing proceeds to step S1111. In step S1111, the CPU 211 determines whether the printing start button 601 is tapped. In a case where the CPU 211 determines that the printing start button 601 is not tapped (NO in step S111), the processing returns to step S106. In step S1106, the CPU 211 displays the print setting checking screen again. In a case where the CPU 211 determines that the printing start button 601 is tapped (YES in step S1111), the processing proceeds to step S1112. In step S1112, the CPU 211 executes a printing process on the image data selected in step S1105 and stored in the predetermined storage area. Specifically, in step S1112, the CPU 211 renders the image data stored in the predetermined storage area and converts the image data into JPEG data that can be printed by the printer. Further, the CPU 211 assigns a print control command including the print setting information set in step S1108 to the JPEG data, and generates print data. Then, the CPU 211 controls the wireless LAN unit 202 to transmit the generated print data to the printing apparatus 300 via the wireless LAN. Specifically, the CPU 211 performs, as a transmission process by the print application, the process of instructing the OS to transmit the print data. Then, the CPU 211 executes the OS to control the wireless LAN unit 202. By this control, the print data is transmitted to the printing apparatus 300. When the process of step S1110 is executed, then in step S1112, the image data subjected to the filter process or the cropping is converted into JPEG data, and the JPEG data is transmitted to the printing apparatus 300.

After execution of the printing process in step S1112, then in step S1113, the CPU 211 executes a rating process for prompting the user to evaluate the print application. The details of the rating process in step S1113 will be described below with reference to FIG. 12.

While, in FIG. 11, the "photograph" button is touched as any of the category selection buttons 408, the present disclosure is not limited to this. Alternatively, any of the category selection buttons 408 illustrated in FIG. 4 may be selected. In this case, the determination illustrated in step S1104 is performed for all the category selection buttons 408. Then, in a case where any of the category selection buttons 408 is selected, a printing process corresponding to the selected category selection button 408 is executed as the processes of steps S1105 to S1112 in FIG. 11. Based on this, the process illustrated in step S1113 is executed.

FIG. 12 is a flowchart illustrating the details of the rating process in step S1113 in FIG. 11.

In step S1201, the CPU 211 determines whether the printing is successful in step S1112.

The method for determining whether the printing is successful differs depending on the model of the printing apparatus 300 for use in printing that is indicated by the registered printer information 605 on the print setting checking screen illustrated in FIG. 6. For example, by executing the print application for a printing apparatus 300 that mainly performs printing on an A4 print sheet, the CPU 211 performs a result checking process. The result checking process is the process in which, after transmitting the print data to the printing apparatus 300, the CPU 211 performs two-way communication with the printing apparatus 300 via the wireless LAN and periodically checks the printing state of the printing apparatus 300. Then, when receiving information indicating that the printing is completed in the printing apparatus 300 from the printing apparatus 300 by the print application, the CPU 211 determines that the printing is successful.

Meanwhile, a printing time taken by the printing apparatus 300 that is large and mainly performs printing on a large print sheet such as an A0 print sheet is often longer than a printing time taken by the printing apparatus 300 that mainly performs printing on an A4 print sheet. Thus, the print application may be designed not to perform the result checking process on the printing apparatus 300 having a large size. In a case where the print application performs the result checking process on the large printing apparatus 300, the print application operates in the foreground for a long time in the terminal apparatus 200. In terms of usability, a state where a particular application operates in the foreground for a long time is not desirable for the terminal apparatus 200 of a mobile type according to the present exemplary embodiment. Thus, in the present exemplary embodiment, the print application does not perform the result checking process on a particular model of a printing apparatus such as the printing apparatus 300 of a large size. In the case of the printing apparatus 300 of a large size, when the transmission of the print data to the printing apparatus 300 is completed in step S1201, the CPU 211 determines that the printing is successful.

In a case where the CPU 211 determines in step S1201 that the printing is not successful (NO in step S1201), the processing proceeds to step S1202. In step S1202, the CPU 211 displays a printing error screen on the touch panel display 204. For example, instead of the printing state display dialog 900 on the printing-in-progress screen illustrated in FIG. 9, a dialog (not illustrated) indicating that the printing results in an error is displayed.

In a case where the CPU 211 determines in step S1201 that the printing is successful (YES in step S1201), the processing proceeds to step S1203. Although described below, in a case where determinations in steps S1203, S1204, and S1207 are all YES and determination in step S1205 is NO in addition to the determination in step S1201, the process of step S1208 is executed. In step S1208, display control for displaying the rating information input screen which is a screen for inputting rating information is executed. That is, the determination results in steps S1201, S1203, S1204, S1205, and S1207 are the conditions set for requesting the user to evaluate the print application.

The processes of step S1203 and after that may be executed every time the determination is YES in step S1201, or there may be a case where the processes of step S1203 and after that are not executed even in a case where the determination in step S201 is YES. That is, there may be a case where the rating information input screen is not displayed regardless of the determination results in steps S1201, S1203, S1204, S1205, and S1207. For example, in a case where the number of times the determination is YES in step S1201 exceeds a predetermined number of times, processing of step S1202 may be executed. Alternatively, after the process of step S1208, the processes of step S1203 and after that may be skipped even in a case where the determination in step S1201 is YES. In a case where the processes of step S1203 and after that are skipped even if the determination in step S1201 is YES, as described above, the processing illustrated in FIG. 12 ends after the process of step S1201. Further, in a case where the determination in step S1201 is NO, the process of step S1202 is executed.

In step S1203, the CPU 211 determines whether the printing apparatus 300 instructed to perform the printing process in step S1112 is a target model of the result checking process. The determination in step S1203 is performed based on the attribute information which is held in the data memory 214 when the printer is registered. For example, the attribute information includes information indicating whether the printing apparatus is a target model of the result checking process. In step S1203, the attribute information is referenced. Alternatively, the determination in step S1203 may be performed by checking a model name which is held in the data memory 214 when the printer is registered (the model name indicated by the registered printer information 605) against a list of result checking target models held in advance by the application. This list is, for example, stored in the data memory 214 or the program memory 213 when the print application is installed on the program memory 213.

In a case where the CPU 211 determines in step S1203 that the printing apparatus 300 is not a target model of the result checking process (NO in step S1203), the processing illustrated in FIG. 12 ends. Meanwhile, in a case where, the CPU 211 determines in step S1203 that the printing apparatus 300 is a target model of the result checking process (YES in step S1203), the processing proceeds to step S1204.

In step S1204, the CPU 211 determines whether the print application used in the execution of the processing illustrated in FIGS. 11 and 12 is a rating target application. The print application according to the present exemplary embodiment is created for a plurality of different OSs. For example, suppose that the print application for an OS (a) is a print application (a), and the print application for an OS (b) is a print application (b). The print application (a) is a rating target, but the print application (b) is not a rating target. The processing in FIGS. 11 and 12 is executed by both the print applications (a) and (b). In step S1204, for example, the CPU 211 determines whether the print application is operating on the OS (a) as a predetermined OS. In a case where the CPU 211 determines that the print application is operating on the OS (a) as the predetermined OS, the print application is the print application (a) and is a rating target. Therefore, the processing proceeds to step S1205. Meanwhile, in a case where the CPU 211 determines that the print application is operating on an OS, for example, the OS (b), different from the OS (a) as the predetermined OS, the print application is not a rating target. Then, the processing illustrated in FIG. 12 ends.

Alternatively, for example, the print application (b) may be created not to execute the processes of step S1204 and after that in FIG. 12 in the first place. As described above, however, the print application according to the present exemplary embodiment is created in a programming language capable of operating in a multi-platform such as HTML5 or JavaScript. Thus, the processing illustrated in FIG. 12 for the print applications (a) and (b) is made similar to each other between the print applications (a) and (b), to easily create a print application.

In step S1205, the CPU 211 determines whether the rating information is already transmitted in the current version of the application. Specifically, the determination in step S1205 is performed based on a rating information transmission completion flag indicating whether the rating information held in the data memory 214 is transmitted. The rating information transmission completion flag is updated by the process of step S1210. In a case where the CPU 211 determines in step S1205 that the rating information is already transmitted (YES in step S1205), the processing illustrated in FIG. 12 ends. In a case where the CPU 211 determines that the rating information has not yet been transmitted (NO in step S1205), the processing proceeds to step S1206.

In step S1206, the CPU 211 communicates with the application control information management server 104, acquires the control information regarding the print application, and holds the control information in the data memory 214. The details of the process of step S1206 will be described below with reference to FIG. 13. In step S1207, the CPU 211 references the control information regarding the print application held in the data memory 214 in step S1206, to determine whether the dialog for inputting the rating information is to be displayed. In a case where the CPU 211 determines in step S1207 that the dialog is not to be displayed (NO in step S1207), the processing illustrated in FIG. 12 ends.

Meanwhile, in a case where the CPU 211 determines in step S1207 that the dialog is to be displayed (YES in step S1207), the processing proceeds to step S1208. In step S1208, the CPU 211 performs display control for displaying the rating information input dialog 1000. By the process of step S1208, the rating information input dialog 1000 illustrated in FIG. 10 is displayed on the touch panel display 204. When the user inputs the rating information to the rating information input dialog 1000 and taps the transmission button 1003, the rating information is transmitted to the application management server 103.

The display of the rating information input dialog 1000 and the transmission of the rating information may be executed under control of the print application, or may be executed by the OS independently of the print application. In the above-described former case, in step S1208, determination regarding the tap on the transmission button 1003 by the user and transmission of the rating information when the transmission button 1003 is tapped are performed. In a case where the rating information input dialog 1000 is displayed by the OS as in the above-described latter case, as display control of the print application, the OS is instructed to display the rating information input screen in step S1208. The rating information is transmitted to the application management server 103 via the wireless LAN and the Internet. The transmitted rating information is reflected on the evaluations of the print application.

In step S1209, the CPU 211 determines whether the rating information is transmitted. For example, in a case where the rating information is transmitted under control of the OS independently of the print application, then in step S1209, the CPU 211 determines whether information indicating that the rating information is transmitted is input to the print application. In a case where the rating information is transmitted under control of the print application, then in step S1209, the CPU 211 determines whether the rating information is transmitted in step S1208.

In a case where the CPU 211 determines in step S1209 that the rating information is not transmitted (NO in step S209), the processing illustrated in FIG. 12 ends. Meanwhile, in a case where the CPU 211 determines that the rating information is transmitted (YES in step S1209), the processing proceeds to step S1210. In step S1210, the CPU 211 updates the rating information transmission completion flag held in the data memory 214 to indicate that the rating information is already transmitted. The updated rating information transmission completion flag will be referenced when the process of step S1205 is executed again. Here, suppose that image data of an image selected by the user is transmitted anew from the terminal apparatus 200 to the printing apparatus 300 currently used or the printing apparatus 300 different from the currently used, and the CPU 211 determines again in step S1201 that the printing is completed, the rating information input screen is not displayed again. Therefore, it is possible to prevent the situation where the user is requested to evaluate the print application again even though the user has already evaluated the print application.

As described above, according to the processing illustrated in FIG. 12, if the printing of image data selected by the user is completed by the print application, display for inputting a rating is performed. Therefore, the situation where the user is requested to perform an evaluation even though the printing is not completed can be prevented. The user can appropriately evaluate the print application in the state where the printing of the data selected by the user is completed.

Further, as described above, after the image data as the printing target is transmitted to the printing apparatus 300, the print application according to the present exemplary embodiment continuously communicates with the printing apparatus 300, to execute the result checking process for checking whether the printing is completed. The print application supports as the printing apparatus 300 both a model on which the result checking process is performed and a model on which the result checking process is not performed. In the present exemplary embodiment, if checking completion of the printing in the model on which the result checking process is performed (the determinations are both YES in steps S1201 and S1203), the rating information input screen is displayed. Accordingly, after reliably checking completion of the printing, the user is prompted to input the rating information.

In the processing procedure of the flowchart illustrated in FIG. 12, the process of determining whether the printing apparatus 300 is a target model of the result checking process (step S1203) may be executed before the process of determining whether the printing is successful (step S1201). Depending on the order of the processing procedure illustrated in FIG. 12, the printing error screen in step S1202 can be displayed also for a model on which the result checking process is not performed. Alternatively, acquiring the control information regarding the application (step S1206) may be performed immediately after the application is started.

As described above, in the processing procedure of the flowchart illustrated in FIG. 12, using the API of the OS, the print application can perform the process of inputting the rating information and the process of transmitting the rating information. In this case, in a case where the print application can specify whether the rating information is transmitted, the processing illustrated in FIG. 12 is performed. Meanwhile, in a case where the print application cannot specify whether the OS transmits the rating information, the processes of steps S1205, S1209, and step S1210 may not be executed. That is, the determination of whether the rating information is already transmitted (step S1205), the determination of whether the rating information is transmitted (step S1209), and the process of updating the rating information transmission completion flag (step S1210) are not performed. Whether the print application can specify whether the OS transmits the rating information depends on the specifications of the OS.

Figure 13:
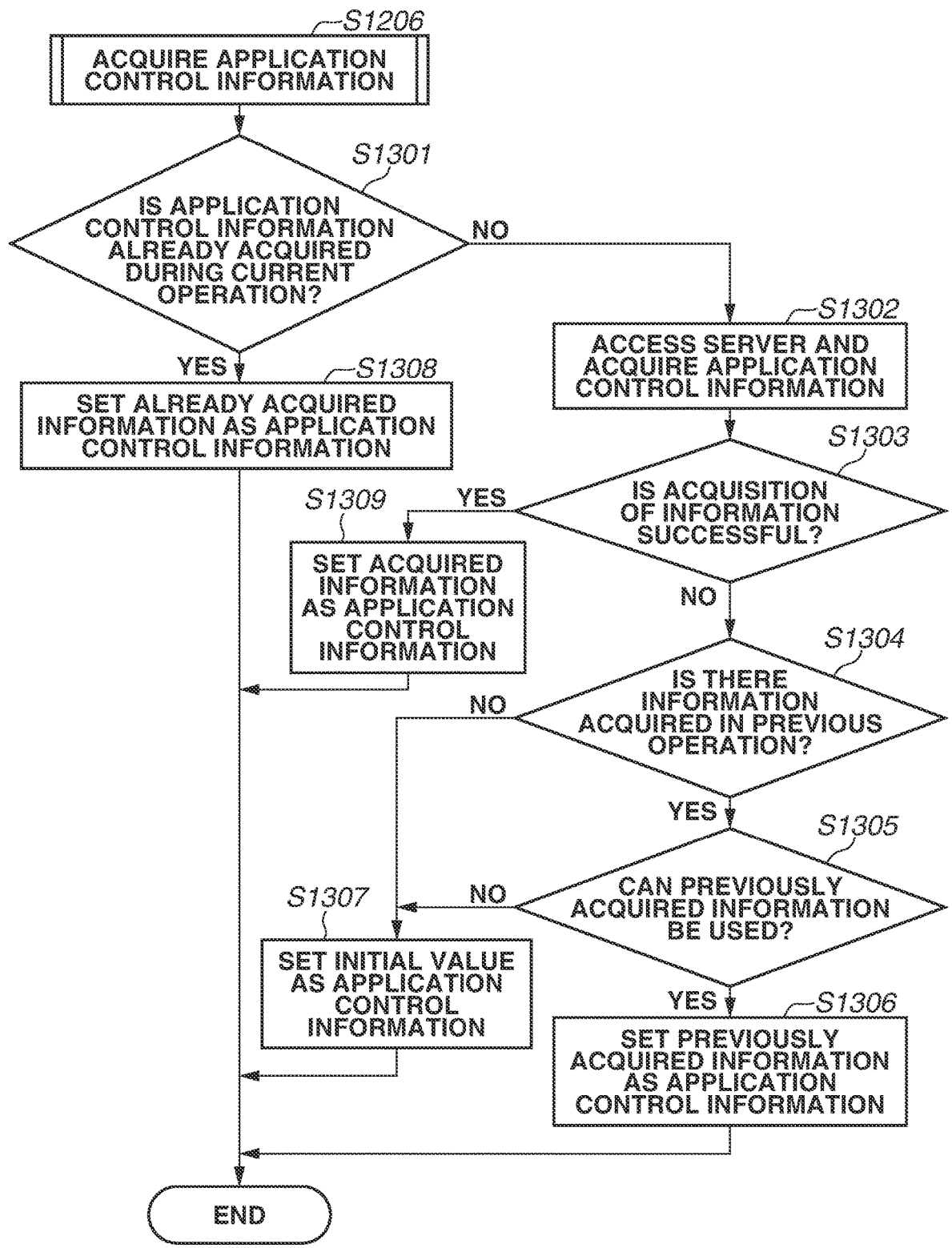
FIG. 13 is a flowchart illustrating details of a process of acquiring application control information.

With reference to a flowchart in FIG. 13, the details of the process of acquiring the application control information in step S1206 are described. The application control information is received from the application control information management server 104. In FIG. 13, however, to reduce the server load and the amount of communication, it is determined whether it is necessary to access the application control information management server 104 to acquire the application control information.

In step S1301, the CPU 211 determines whether the application control information is acquired during the current operation of the print application. In a case where the application control information is already acquired during the current operation (YES in step S1301), the processing proceeds to step S1308. In step S1308, the CPU 211 sets the already acquired information as the control information, and the processing illustrated in FIG. 13 ends.

By the processes of steps S1301 and S1308, access to the application control information management server 104 even though the application control information does not change in the server during the operation of the application can be prevented. In the processes, information previously acquired and held in the data memory 214 is used as the application control information. That is, access to the application control information management server 104 can be prevented, and therefore a reduction in the server load and a reduction in the amount of communication can be expected.

In a case where the CPU 211 determines in step S1301 that the application control information is not acquired during the operation of the application (NO in step S1301), the processing proceeds to step S1302. In step S1302, the CPU 211 accesses the application control information management server 104 and acquires the application control information. In step S1303, the CPU 211 determines whether acquisition of the application control information from the application control information management server 104 is successful. In a case where the CPU 211 determines in step S303 that acquisition of the application control information from the application control information management server 104 is successful (YES in step S1303), the processing proceeds to step S1309. In step S1309, the CPU 211 sets the acquired information as the control information and saves the acquired information in the data memory 214.

In a case where the CPU 211 determines in step S1303 that acquisition of the application control information is failed (NO in step S1303), the processing proceeds to step S1304. In step S1304, the CPU 211 determines whether there is application control information acquired not during the current operation of the print application but in an operation performed before the current operation (e.g., in the previous operation). In a case where the determination is NO in step S1304 (NO in step S1304), the processing proceeds to step S1307. In step S1307, the CPU 211 sets an initial value determined in advance by the print application as the application control information and saves the application control information in the data memory 214.

In a case where the determination is YES in step S1304 (YES in step S1304) the processing proceeds to step S1305. In step S1305, the CPU 211 determines whether the application control information acquired before the current operation of the print application can be used. Specifically, in step S1305, the CPU 211 checks setting information determined in advance by the print application and stored in the program memory 213 or the non-volatile memory 221. In a case where the CPU 211 determines that the previously acquired information cannot be used, the processing proceeds to step S1307. In step S1307, regardless of the presence or absence of previously acquired information, the CPU 211 sets the initial value determined in advance as the application control information and saves the application control information in the data memory 214.

The setting information referenced in step S1305 indicates how to perform a determination in step S1305, and is determined by, for example, the creator of the print application. Then, when the print application is installed, the setting information is stored in the program memory 213 or the non-volatile memory 221. Based on the setting information, even if it is unclear whether the rating information input screen can be displayed because the terminal apparatus 200 cannot communicate with the server, whether the rating information input screen should be displayed can be determined.

In a case where the CPU 211 determines in step S1305 that the previously acquired information can be used (YES in step S1305), the processing proceeds to step S1306. In step S1306, the CPU 211 sets the previously acquired information as the application control information and saves the application control information in the data memory 214.

A specific example of the processing in FIG. 13 is described. For example, suppose that as the setting information referenced in step S1305, information indicating that "previously acquired information is not to be used" is set. Further, suppose that the initial value of the application control information set in step S1307 is a value indicating that "the rating information input screen is not to be displayed".

Based on the above premise, suppose that in the current operation of the print application, the application control information management server 104 stores, as the application control information, information indicating that "the rating information input screen is to be displayed". In this case, when the determination is NO in step S1301, and the determination is YES in step S1303, then in step S309, the terminal apparatus 200 acquires the application control information indicating that "the rating information input screen is to be displayed". Meanwhile, when the determination is NO in step S1303, then based on the determination in step S1304 or S1305, the process of step S1306 is not performed. Then, in step S1307, as the application control information, the terminal apparatus 200 acquires information indicating that "the rating information input screen is not to be displayed" is acquired.

That is, based on the above premise, after the print application is started for the current operation, the rating information input screen is not displayed unless the terminal apparatus 200 acquires the application control information from the application control information management server 104.

Another specific example of the processing in FIG. 13 is described. For example, similarly to the above example, suppose that as the setting information referenced in step S1305, information indicating that "previously acquired information is not to be used" is set. Further, suppose that the initial value of the application control information set in step S1307 is a value indicating that "the rating information input screen is not to be displayed". Furthermore, suppose that in the current operation of the print application, the application control information management server 104 stores, as the application control information, information indicating that "the rating information input screen is not to be displayed". In this case, the process of step S1306 in FIG. 13 is not performed, and in any of steps S1307 to S1309, information indicating that "the rating information input screen is not to be displayed" is acquired as the application control information. Therefore, in FIG. 12, the determination in step S1207 is NO, and the rating information input screen is not displayed in step S1208.

As described above, according to the processing illustrated in FIGS. 12 and 13, based on the application control information acquired from the application control information management server 104 by the terminal apparatus 200, whether the rating information input screen is to be displayed is determined. Accordingly, the application control information is appropriately updated by the application control information management server 104, and therefore the terminal apparatus 200 can display the rating information input screen at an appropriate timing and in an appropriate situation.

Further, in a case where the application control information is acquired in the current operation of the print application, the terminal apparatus 200 does not access the server again to acquire the application control information. Therefore, the frequency of access to the application control information management server 104 can be reduced and the processing load of the terminal apparatus 200 and the application control information management server 104 can be reduced.

While, in the present exemplary embodiment, as in step S1301, determination of whether the rating information is to be displayed is performed once during the operation of the print application, the present disclosure is not limited to the above-described configuration. For example, when a particular screen is displayed by the print application, the terminal apparatus 200 may access the application control information management server 104 and acquire the application control information. Alternatively, during the operation of the print application, the terminal apparatus 200 may access the application control information management server 104 at regular intervals and acquire the application control information.

In the present exemplary embodiment, the example case where the application control information includes information indicating whether the rating information input screen is to be displayed is described. Information included in the application control information, however, is not limited to this. For example, function information indicating whether a certain function of the application is to be enabled may be included. In a case where the CPU 211 executes the print application and acquires the function information, the CPU 211 displays a button for a function that is to be enabled according to the indication by the function information, on a screen of the print application. The CPU 211 does not display a button for a function that is not to be enabled according to the indication by the function information, on a screen of the print application. The application control information may further include model information regarding a model of a printing apparatus that executes printing by the print application. For example, in step S1103, the CPU 211 may perform the registration process to allow the model indicated by the model information to be registered.

In the first exemplary embodiment, the application control information includes the information indicating whether the rating information input screen can be displayed. In the second exemplary embodiment, in addition to the information indicating whether the rating information input screen can be displayed, the application control information includes version information indicating an application version for which the rating information input screen can be displayed.

For example, suppose that when the print application of a version 1.0.0 is published in the beginning, the information indicating whether the rating information input screen can be displayed indicates "can be displayed" in the application control information stored in the application control information management server 104. In this case, the rating information input screen can be displayed for the print application of the version 1.0.0. Then, suppose that the information, indicating whether the rating information input screen can be displayed, included in the application control information stored in the application control information management server 104 is changed to "cannot be displayed". This prevents displaying of the rating information input screen. After that, in a case where a version 2.0.0 created by adding a new function to the print application of the version 1.0.0 is published, evaluation of the print application may be needed again. In this case, the information, indicating whether the rating information input screen can be displayed, included in the application control information stored in the application control information management server 104 is changed to "can be displayed".

By the above-described change, the rating information input screen is displayed for the print application of the version 2.0.0. However, for the print application of the version 1.0.0 which does not have the new function, the rating information input screen may also be displayed. To avoid this, the application control information includes version information indicating an application version for which the rating information input screen can be displayed. The version information indicates the minimum (oldest) version for which the rating information input screen can be displayed.

As described in step S1207 in FIG. 12, in a case where the information, indicating whether the rating information input screen can be displayed, in the application control information indicates "cannot be displayed" based on the print application, the CPU 211 determines that the rating information input screen is not to be displayed. In a case where the information indicating whether the rating information input screen can be displayed indicates "can be displayed", the CPU 211 uses the version information. Specifically, in a case where the version indicated by the version information is a version same as or older than the version of the print application that is currently operating, then in step S1207, the CPU 211 determines that the rating information input screen is to be displayed. Meanwhile, in a case where the version indicated by the version information is a version newer than the version of the application that is currently operating, then in step S1207, the CPU 211 determines that the rating information input screen is not to be displayed.

For example, suppose that the information indicating whether the rating information input screen can be displayed is set to "can be displayed", and the version information indicates the version "2.0.0". In this case, for the print application of the version 1.0.0, the rating information input screen is not displayed, and for the print application of the version 2.0.0, the rating information input screen is displayed.

In the second exemplary embodiment, an example has been described where the information indicating whether the rating information input screen can be displayed and the version information are included as different pieces of information in the application control information. In a third exemplary embodiment, an example case where the application control information includes information having the above-described pieces of information together will be described.

As a specific example, the application control information lists versions for which the rating information input screen can be displayed as in "2.0.0, 3.0.0, 5.0.0". In step S1207, in a case where a version of the application that is currently operating is included in the application control information, the CPU 211 determines that the rating information input screen "can be displayed" (YES in step S1207). Meanwhile, in a case where a version of the application that is currently operating is not included in the application control information, the CPU 211 determines that the rating information input screen "cannot be displayed" (NO in step S1207). For example, suppose that the version information regarding a version for which the rating information input screen can be displayed indicates "2.0.0, 3.0.0, 5.0.0" as described above. In this case, for the print application of versions 1.0.0 and 4.0.0, the rating information input screen is not displayed, and for the print application of versions 2.0.0, 3.0.0, and 5.0.0, the rating information input screen can be displayed.

In the present exemplary embodiment, the version information regarding a version for which the rating information input screen can be displayed is used as an example. That is, this method is suitable for a case where displaying the rating information input screen is allowed for a particular version. However, version information regarding a version for which the rating information input screen is not displayed may be included in the application control information. For example, in a case where the version information indicates "2.0.0, 3.0.0, 5.0.0", the rating information input screen is not displayed for the print application of the versions 2.0.0, 3.0.0, and 5.0.0. Meanwhile, for the print application of the versions 1.0.0 and 4.0.0 and a version 6.0.0, the rating information input screen is displayed. This method is suitable for a case where displaying the rating information input screen is not allowed for a print application of a particular version.

In the above exemplary embodiments, the print application is described as an example of an application. The present disclosure, however, is not limited to this. Alternatively, various applications such as a photograph management application and a web browser may be used. Yet alternatively, for example, an application for displaying data as a display target on an external display device may be used. That is, the processing according to the present exemplary embodiments can be applied to an application for causing an external device to execute various processes. In this case, if the CPU 211 causes the external device to execute a predetermined process using the application, and the predetermined process is completed, an input screen for inputting the evaluation of the application is displayed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-110638, filed Jun. 13, 2019, which is hereby incorporated by reference herein in its entirety.

What is claimed is:

1. An information processing method by implementing at least one processor that executes a program, the information processing method comprising:
   executing, by the program, transmission processing for causing an information processing apparatus to transmit data corresponding to a printing target image to a printing apparatus;
   receiving, by the program, predetermined information that is transmitted from a server, wherein the predetermined information is related to an evaluation of the program; and
   causing, by the program, a display of the information processing apparatus to display an input screen on which a user is able to input an evaluation of the program, based on print processing for the printing target image being performed,
   wherein in a case where first information is received as the predetermined information, the input screen is displayed, and in a case where second information different from the first information is received as the predetermined information, the input screen is not displayed,
   wherein the at least one processor executes the program to further perform displaying a list of a plurality of thumbnails corresponding to a plurality of images stored in the information processing apparatus on the display, and selecting an image corresponding to a thumbnail selected from among the plurality of thumbnails according to an instruction issued by the user on the display as the printing target image, and
   wherein data corresponding to the selected printing target image is transmitted in the transmission processing.

2. The information processing method according to claim 1, further comprising perform determining processing that determines whether the input screen is to be displayed, based on the received predetermined information.

3. The information processing method according to claim 2, wherein in a case where receiving the predetermined information transmitted from the server is failed, the determining processing is performed based on information set in advance in the program without communicating with the server.

4. The information processing method according to claim 2, wherein in a case where receiving the predetermined information transmitted from the server is failed, the determining processing is performed based on the predetermined information that was received before the program is currently operated and has been stored in the information processing apparatus.

5. The information processing method according to claim 1,
   further comprising performing determining processing that determines whether printing by the printing apparatus based on the data transmitted from the information processing apparatus is completed, and
   wherein, after the printing is completed, the input screen is displayed.

6. The information processing method according to claim 5, wherein, based on information transmitted from the printing apparatus after the transmission of the data, the determining processing that determines whether the printing is completed is performed.

7. The information processing method according to claim 6,
   wherein the program supports a first model and a second model serving as the printing apparatus to which the information processing apparatus transmits the data, the first model being the printing apparatus for which the determining processing is performed, the second model being the printing apparatus for which the determining processing is not performed, and
   wherein in the displaying, further if the printing apparatus is the first model, the input screen is displayed on the display.

8. The information processing method according to claim 7,
   wherein, for the second model, in a case where the transmission of the data from the information processing apparatus is completed, it is determined that the printing of the data is completed, and
   wherein regardless of whether the printing apparatus is the first model or the second model, in a case where it is determined that the printing of the data is not completed, a predetermined error screen is displayed on the display.

9. The information processing method according to claim 5, wherein in a case where the user inputs an evaluation on the displayed input screen, and the information processing apparatus transmits the input evaluation to a predetermined server according to an instruction issued by the user, the input screen is not to be displayed on the display again even in a case where data is transmitted aPreviously Presented and printing of the data transmitted aPreviously Presented is completed.

10. The information processing method according to claim 1, wherein the program is a print application that operates under control of an operating system (OS).

11. The information processing method according to claim 10, wherein in the displaying, further if the print application operates under control of a predetermined OS, the input screen is displayed on the display.

12. An information processing apparatus comprising:
   a memory that stores a program; and
   at least one processor that executes the program stored in the memory to perform:
   executing, by the program, transmission processing for causing the information processing apparatus to transmit data corresponding to a printing target image to a printing apparatus,
   receiving, by the program, predetermined information that is transmitted from a server, wherein the predetermined information is related to an evaluation of the program, and
   causing, by the program, a display of the information processing apparatus to display an input screen on which a user is able to input an evaluation of the program, based on print processing for the target image being performed,
   wherein in a case where first information is received as the predetermined information, the input screen is displayed, and in a case where second information different from the first information is received as the predetermined information, the input screen is not displayed,
wherein the at least one processor executes the program to further perform displaying a list of a plurality of thumbnails corresponding to a plurality of images stored in the information processing apparatus on the display, and selecting an image corresponding to a thumbnail selected from among the plurality of thumbnails according to an instruction issued by the user on the display as the printing target image, and
wherein data corresponding to the selected printing target image is transmitted in the transmission processing.

13. The information processing apparatus according to claim 12, further comprising perform determining processing that determines whether the input screen is to be displayed, based on the received predetermined information.

14. The information processing apparatus according to claim 13, wherein in a case where receiving the predetermined information transmitted from the server is failed, the determining processing is performed based on information set in advance in the program without communicating with the server.

15. The information processing apparatus according to claim 13, wherein in a case where receiving the predetermined information transmitted from the server is failed, the determining processing is performed based on the predetermined information that was received before the program is currently operated and has been stored in the information processing apparatus.

16. The information processing apparatus according to claim 12,
further comprising performing determining processing that determines whether printing by the printing apparatus based on the data transmitted from the information processing apparatus is completed, and
wherein, after the printing is completed, the input screen is displayed.

17. The information processing apparatus according to claim 16, wherein, based on information transmitted from the printing apparatus after the transmission of the data, the determining processing that determines whether the printing is completed is performed.

18. The information processing apparatus according to claim 17,
wherein the program supports a first model and a second model serving as the printing apparatus to which the information processing apparatus transmits the data, the first model being the printing apparatus for which the determining processing is performed, the second model being the printing apparatus for which the determining processing is not performed, and
wherein in the displaying, further if the printing apparatus is the first model, the input screen is displayed on the display.

19. The information processing apparatus according to claim 18,
wherein, for the second model, in a case where the transmission of the data from the information processing apparatus is completed, it is determined that the printing of the data is completed, and
wherein regardless of whether the printing apparatus is the first model or the second model, in a case where it is determined that the printing of the data is not completed, a predetermined error screen is displayed on the display.

20. The information processing apparatus according to claim 16, wherein in a case where the user inputs an evaluation on the displayed input screen, and the information processing apparatus transmits the input evaluation to a predetermined server according to an instruction issued by the user, the input screen is not to be displayed on the display again even in a case where data is transmitted aPreviously Presented and printing of the data transmitted aPreviously Presented is completed.

21. The information processing apparatus according to claim 12, wherein the program is a print application that operates under control of an operating system (OS).

22. The information processing apparatus according to claim 21, wherein in the displaying, further if the print application operates under control of a predetermined OS, the input screen is displayed.

23. The information processing apparatus according to claim 12,
wherein the at least one processor executes the program to further perform displaying a list of a plurality of thumbnails corresponding to a plurality of images stored in the information processing apparatus on the display, and selecting an image corresponding to a thumbnail selected from among the plurality of thumbnails according to an instruction issued by the user on the display as the printing target image, and
wherein data corresponding to the selected printing target image is transmitted in the transmission.

24. An information processing method by implementing at least one processor that executes a program, the information processing method comprising:
executing transmission processing for causing an information processing apparatus to transmit data corresponding to a printing target image to a printing apparatus;
receiving predetermined information that is transmitted from a server; and
causing a display of the information processing apparatus to display an input screen on which a user is able to input an evaluation of the program,
wherein in a case where first information is received as the predetermined information, the input screen is displayed, and in a case where second information different from the first information is received as the predetermined information, the input screen is not displayed,
wherein in a case where receiving the predetermined information is failed, the input screen is displayed if the first information has been stored in advance in the information processing apparatus, and the input screen is not displayed if the second information has been stored in advance in the information processing apparatus,
wherein the at least one processor executes the program to further perform displaying a list of a plurality of thumbnails corresponding to a plurality of images stored in the information processing apparatus on the display, and selecting an image corresponding to a thumbnail selected from among the plurality of thumbnails according to an instruction issued by the user on the display as the printing target image, and
wherein data corresponding to the selected printing target image is transmitted in the transmission processing.

25. An information processing apparatus comprising:
a memory that stores a program; and
at least one processor that executes the program stored in the memory to perform:

executing transmission processing for causing the information processing apparatus to transmit data corresponding to a printing target image to a printing apparatus, receiving predetermined information that is transmitted from a server, and causing a display of the information processing apparatus to display an input screen on which a user is able to input an evaluation of the program, wherein in a case where first information is received as the predetermined information, the input screen is displayed, and in a case where second information different from the first information is received as the predetermined information, the input screen is not displayed, wherein in a case where receiving the predetermined information is failed, the input screen is displayed if the first information has been stored in advance in the information processing apparatus, and the input screen is not displayed if the second information has been stored in advance in the information processing apparatus, wherein the at least one processor executes the program to further perform displaying a list of a plurality of thumbnails corresponding to a plurality of images stored in the information processing apparatus on the display, and selecting an image corresponding to a thumbnail selected from among the plurality of thumbnails according to an instruction issued by the user on the display as the printing target image, and wherein data corresponding to the selected printing target image is transmitted in the transmission processing.

* * * * *